US012458250B2

(12) United States Patent
Pierart (10) Patent No.: US 12,458,250 B2
(45) Date of Patent: Nov. 4, 2025

(54) MULTI-POSITION CAPSULE (71) Applicant: WIZP AS, Horten (NO)

(72) Inventor: Luc Pierart, Villejuif (FR)

(73) Assignee: WIZP AS, Horten (NO)

( * ) Notice: Subject to any disclaimer, the term of this patent is extended or adjusted under 35 U.S.C. 154(b) by 1009 days.

(21) Appl. No.: 17/265,439

(22) PCT Filed: Aug. 2, 2019

(86) PCT No.: PCT/EP2019/070945
§ 371 (c)(1),
(2) Date: Feb. 2, 2021

(87) PCT Pub. No.: WO2020/025820
PCT Pub. Date: Feb. 6, 2020

(65) Prior Publication Data
US 2021/0251527 A1 Aug. 19, 2021

(30) Foreign Application Priority Data

Aug. 3, 2018 (EP) .................................. 18306065

(51) Int. Cl.
A61B 5/145 (2006.01)
A61B 5/00 (2006.01)
(52) U.S. Cl.
CPC ........ *A61B 5/14514* (2013.01); *A61B 5/6833* (2013.01); *A61B 5/6841* (2013.01); *A61B 5/685* (2013.01); *A61B 5/681* (2013.01); *A61B 2560/0214* (2013.01); *A61B 2560/0443* (2013.01); *A61B 2562/227* (2013.01)
(58) Field of Classification Search
None
See application file for complete search history.

(56) References Cited

U.S. PATENT DOCUMENTS

2002/0188221 A1* 12/2002 Sohrab ............. A61B 5/150503
600/573
2015/0257687 A1* 9/2015 Pushpala .................. A61B 5/01
600/345

FOREIGN PATENT DOCUMENTS

CN 108310615 A 7/2018
WO 2018/104647 A1 6/2018

OTHER PUBLICATIONS

International Search Report dated Sep. 5, 2019 from the European Patent Office in Application No. PCT/EP2019/070945.
Written Opinion of the International Searching Authority dated Sep. 5, 2019 in Application No. PCT/EP2019/070945.
Extended Search Report dated Jan. 2, 2019 from the European Patent Office in Application No. 18306065.6.

* cited by examiner

*Primary Examiner* — Michael R Bloch
(74) *Attorney, Agent, or Firm* — Sughrue Mion, PLLC (57) ABSTRACT A capsule (220), said capsule (220) having a coupling face (222) configured to be coupled to a complementary shape on a housing (120), and a microneedle array (210) that is positioned on a planar contact surface (229). The coupling face (222) has rotational symmetry about an axis of rotation (Z) which extends orthogonally to the planar surface (229) and about which at least two coupling positions are permitted with a single and unique complementary shape on a housing (120), there being, within a fixed reference frame, no microneedle (210) in the same location as that of a different microneedle (210), in the two positions.

15 Claims, 4 Drawing Sheets

MULTI-POSITION CAPSULE

This application is a National Stage of International Application No. PCT/EP2019/070945 filed Aug. 2, 2019, claiming priority based on European Patent Application No. 18306065.6 filed Aug. 3, 2018.

GENERAL TECHNICAL FIELD

The present invention relates to a body monitoring system via body, typically interstitial, fluid analysis using microneedles.

More specifically, the present invention concerns a capsule including microneedles, for the management of the microneedles in the skin.

STATE OF THE ART

Some pathologies such as diabetes require daily monitoring of biochemical parameters of the human body, i.e. concentrations of some compounds (glycemia in the example of glucose).

To this end, it is common to prick a point of the skin so as to bead up a drop of blood, and to analyze this drop either reactively (for example with a strip) or electronically (for example by at least one analytical sensor), so as to estimate the target parameter(s).

Much less invasive advanced systems are known today, which simply analyze the interstitial fluid, that is to say, the fluid that fills the space between blood capillaries and cells. It has indeed an ionic composition close to that of blood plasma.

These advanced systems thus allow monitoring the desired biochemical parameters transcutaneously that is to say without the need to evenly pierce the skin and take samples.

Devices with microneedles are known, which have the advantage of being less invasive than conventional needles. However, it is important that these microneedles remain in place.

There are for that purpose indwelling devices where microneedles are held on the skin with an adhesive tape. However, it is desirable to be able to carry out a continuous or quasi-continuous control, which requires autonomous devices. The GlucoWatch device, which used iontophoresis (and not needles) can be cited. This principle is very painful (strong irritations), so that it is hardly usable The device is also known from document WO2018104647, which has a casing comprising a removable capsule, the capsule accommodating microneedles configured to sample interstitial fluid. The casing, for its part, accommodates most part of the electronics.

This portable device, typically on the wrist, allows continuous measurement and it suffices to change the capsule in order to change microneedles.

However, when such a device is worn on the wrist and when it is removable, it generates skin irritations that are stronger if the person is diabetic or obese. The difficulty lies in the skin's acceptance of the recurrent presence of numerous microneedles, without necessarily having to move the device from one limb to another.

The invention aims at overcoming these difficulties.

PRESENTATION OF THE INVENTION

In order to address some of these difficulties, the invention proposes according to a first aspect, a capsule for a body monitoring system, the capsule, comprising:

a coupling face configured to be coupled with a complementary shape of a casing, an array of microneedles positioned on a planar contact surface and configured to be inserted into the skin to sample or analyze a body fluid from the wearer of the body monitoring device when the latter is positioned on the limb.

characterized in that:

the coupling face has rotational symmetry about an axis of rotation orthogonal to the planar surface, around which at least two coupling positions are authorized with a single complementary shape of a casing, no microneedle is at the same location, in a fixed reference frame, as another microneedle in the two positions.

In one embodiment, the array of microneedles occupies less than half of the contact surface, the microneedles being preferably on the same half of the contact surface.

In one embodiment, the array of microneedles occupies less than one third and at least three positions are defined (or one quarter and four positions).

In one embodiment, the coupling face has an unchanged shape for the coupling with a casing according to the two positions.

In one embodiment, the capsule comprises on the coupling face a first set of electrical connectors.

In one embodiment, the capsule comprises on the coupling face a second set of electrical connectors, redundant relative to the first set of electrical connectors.

In one embodiment, the capsule comprises a position indicator to indicate to the user the position of the capsule.

In one embodiment, the position indicator is a visual indicator represented on the planar surface of the microneedles, for example a word/digit/sign or two adjacent words/digits in the inverted position relative to each other.

In one embodiment, the position indicator is an electrical indicator, for example by means of an electrical contact on the coupling face for the automatic identification by the casing.

According to the first aspect, the invention also proposes a body monitoring system intended to be attached to a limb of a living being, comprising:

a casing, comprising a coupling face, a capsule as described above, the coupling face of the casing having a single location for receiving the capsule in the two positions.

In another aspect, the invention also proposes a body monitoring system intended to be attached to a limb of a living being, comprising:

a casing, comprising a coupling face, a capsule comprising microneedles configured to be inserted into the skin to sample and/or analyze a bodily fluid from the wearer of the body monitoring system when the latter is positioned on the limb, the capsule comprising a coupling face, the casing and the capsule can be coupled by means of the coupling faces, in which the capsule has two different coupling positions on the coupling face of the casing, in which the microneedles are not in the same place between the two positions, in the reference frame of the casing.

These two aspects cover the same common inventive concept, which is that of a displacement of a capsule (rotation, translation relative to the capsule), but with different specificities: in one case, the displacement of the capsule is transparent for the casing (which means that the technical and structural characteristics are essentially the capsule); in another case, the casing comprises several locations for receiving the capsule in different positions (which means that the technical and structural characteristics are essentially the capsule).

In one embodiment, in the reference frame of the casing, the displacement between the two positions is only a rotation.

In one embodiment, the reference frame of the casing, the displacement between the two positions is only a translation.

In another aspect, the invention proposes a kit of capsules for a body monitoring system, each capsule comprising:
  a coupling face configured to be coupled with a complementary shape of a casing, the complementary shape of a casing being the same for each of the capsules,
  an array of microneedles positioned on a planar contact surface and configured to be inserted into the skin to sample or analyze a body fluid from the wearer of the body monitoring device when the latter is positioned on the limb, characterized in that none of the microneedles of a capsule is in the same location, in a fixed reference frame, as another microneedle of another capsule.

These three aspects cover the same common inventive concept, which is that of a displacement of the microneedles relative to the casing, so as to space out the recurrence of the penetration of microneedles in the skin at the same location, without necessarily having to move the device from one limb to another.

For any system presented previously, in one embodiment, the system comprises a casing, the casing comprising a battery and a processor configured to receive the data relating to the fluid sampled or analyzed by the microneedles.

For any system presented above, in one embodiment, the casing comprises two redundant sets of electrical connectors, to ensure the electrical connection in the two positions of the capsule, in combination with a capsule comprising a single set of electrical connectors.

For any system presented previously, in one embodiment, the system comprises a patch, the capsule being removably attachable to the patch and the patch being removably attachable to the casing, the patch having an adhesive 25 role.

For any system presented above, in one embodiment, the patch comprises a central orifice inside which the capsule is positioned, the orifice having a shape complementary to the capsule, so that the capsule can be positioned in the patch according to the two positions.

For any system presented above, in one embodiment, the system comprises a bracelet or armband or strap, configured to hold the casing in place on the limb.

Finally, the invention concerns a method for moving the microneedles by means of a system as defined above, comprising a step of moving the capsule from a first to a second position so that the microneedles have changed their position relative to the casing.

The method can comprise a step of removing the capsule then a step of repositioning the capsule after having moved the capsule in rotation or in translation, Alternatively, the method can comprise a step of sliding the capsule in the casing.

PRESENTATION OF THE FIGURES

Other characteristics and advantages of the present invention will become apparent upon reading the following description of a preferred embodiment. This description will be given with reference to the appended drawings in which.

DETAILED DESCRIPTION

With reference to FIGS. 1 to 4, the present invention concerns an electronic body monitoring system 1. It is an improvement in the device from document WO2018104647. Consequently, the invention falls within the same general concept of an autonomous integral system with low pain and low hygiene risk which is reusable.

By "body monitoring" is meant the verification of biochemical constants of a person wearing the system 1, typically the concentration of a protein, a hormone, a marker, oxygen, nutrients, etc., in the interstitial fluid of the person. The example of glycemia can be cited. Those skilled in the art will be able, if necessary, to monitor other physical body quantities such as lactate, hydration etc.

The description will be illustrated with interstitial fluid but applies to the other body fluids such as blood.

The system 1 is said to be autonomous because it does not require the use of additional equipment.

The system 1 is intended to be attached to a limb of a living being, typically an arm or a leg of a human being. The preferred attachment area is the wrist where the system 1 is similar to a watch.

The system 1 is formed of two modules 100, 200 interconnected by a separable link 300. A coupled position and a free position are thus defined. In the coupled position, the two modules 100, 200 are not physically separated and can exchange data.

The first module 100 comprises a casing 120 and preferably means for attaching and tightening 110 the system 1 to a limb (called strap 112 or bracelet). The second module 200 comprises a capsule 220 with measurement microneedles 210 disposed on a contact face 229 and configured to be inserted into the skin (in a superficial part of the epidermis). These measurement microneedles 210, when the first module 100 is in position on the limb, allow sampling and/or analyzing a body fluid, as mentioned above (see FIGS. 2a and 2b). In the case of pierced microneedles forming a channel in each microneedle, a sample can be taken by fluidly connecting a system for pumping the interstitial fluid to the channel, or simply by capillarity. An analysis system may comprise microneedles each provided with an electrode or a set of electrodes, or be offset after the microneedles, so as to cause an electrochemical reaction adapted to detect an analyte in the interstitial fluid.

The measurement microneedles 210 advantageously consist of an array of measurement microneedles 210 in contact with the skin when the capsule 220 is placed on the body of a person. The microneedles 210 can therefore be either hollow, to sample fluid, or full, to analyze the fluid directly. In the first case, typically, the microneedles 210 allow the extraction of interstitial fluid from the dermis painlessly without beading up blood, and send it to a sensor. In the second case, the microneedles 210 do not sample any fluid and integrate the sensor on their surface, in the form of a biochemical material able to react with the analyte desired be measured in the fluid.

There are other microneedles disposed on the contact face 229 (reference electrode, etc.). They are also referenced 210 like the measurement microneedles for the rest of the description.

Preferably, said microneedles 210 comprise between four and fifty, substantially pyramidal, microneedles 210 with tips of a height comprised between 100 μm and 1,000 μm, preferably 0.3 mm and 0.8 mm. Each of these advantageous characteristics of the microneedles 210 can be taken separately or in combination with the other ones.

As explained previously, in one variant, the microneedles 210 do not sample any fluid and integrate the sensor on their surface, in the form of a biochemical material able to react with the analyte desired to be measured in the fluid. In another variant, the microneedles 210 sample fluid to send it to a sensor.

The two modules 100 and 200 each have a coupling face 122, 222, of complementary shape, which allows placing the second module 200 in a location for accommodating the first module 100. A coupling plane relative to the coupling face 222 of the capsule 220 is defined. The coupling face is therefore mechanical.

Several embodiments will be presented to make it possible to move the microneedles 210 without moving the position system on the limb.

First Embodiment: A Single Complementary Shape of the Casing 120

In this first embodiment, the capsule 220 alone allows solving the problems mentioned in the introduction.

The casing 120 has, on its coupling face 122, a single shape configured to receive the capsule 220. The coupling face 122 of the capsule 220, for its part, has rotational symmetry about an axis Z orthogonal to the coupling plane. In other words, there are at least two positions, obtained successively by rotation, for which the shape of the coupling face 222 of the capsule 200 remains unchanged. This rotation can be of 180° (as illustrated in the Figures) or of 90° for example. The value of the rotation depends on the location of the microneedles 210—this will be explained thereafter.

In this way, the capsule 220 can be coupled with the casing 120 according to at least a first position and a second position. In a fixed reference frame (for example the casing 120), the two positions differ from a rotation along the axis Z of the capsule 220.

In other words, the rotation of the capsule 220 is mechanically invisible for the casing 120, which can be coupled with the capsule 220 in the first and second position in the same complementary shape of its coupling face 122. As regards the management of the electrical coupling, if present, it will be described later.

The microneedles 210 are placed in array on a contact surface 229 of the capsule 220 such that, in a fixed reference frame (for example the casing 120 or the limb), no microneedle 210 of the array is at the same location as a microneedle 210 of the array between the first position and the second position.

Figure 1:
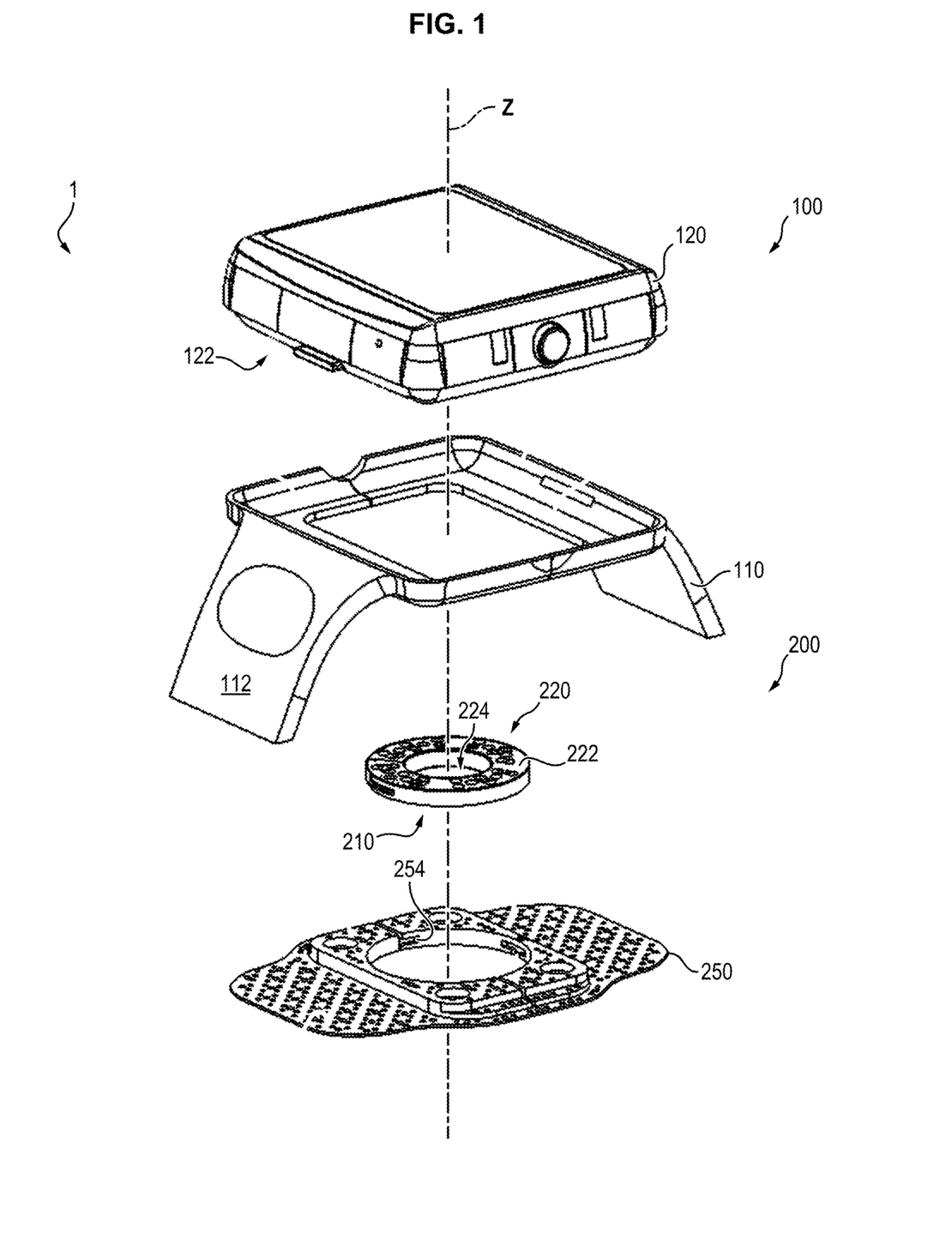
FIG. 1 illustrates an exploded view of a bracelet, a casing, a capsule and a patch as usable in the framework of the invention.
Figure 2A:
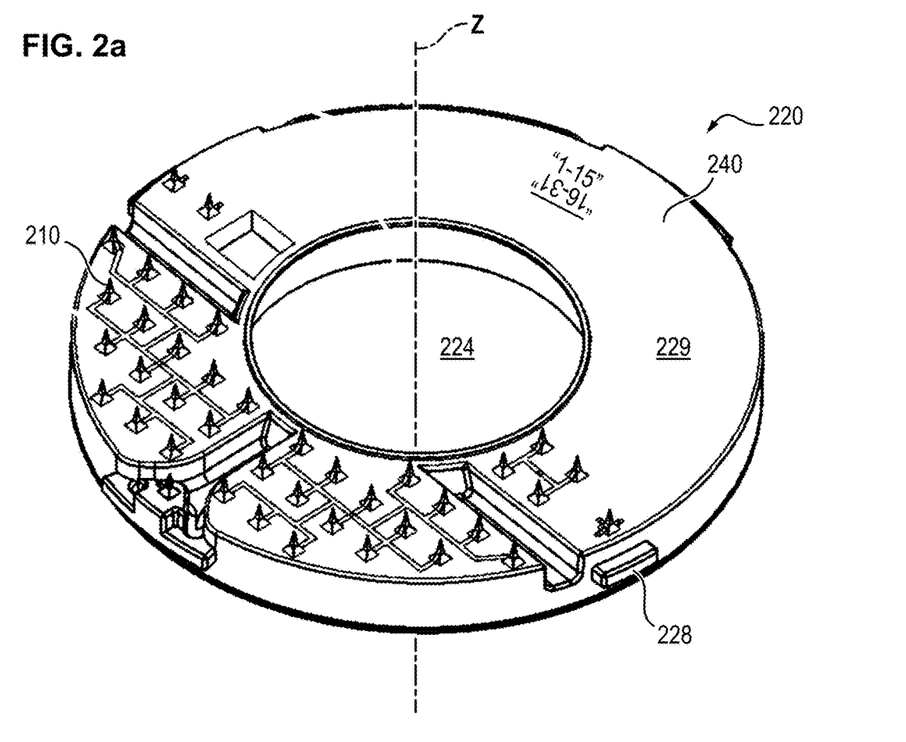
FIGS. 2a, 2b and 3 illustrate a three-dimensional view of a capsule: the contact face with a microneedle (two views) and the coupling face.
Figure 2B:
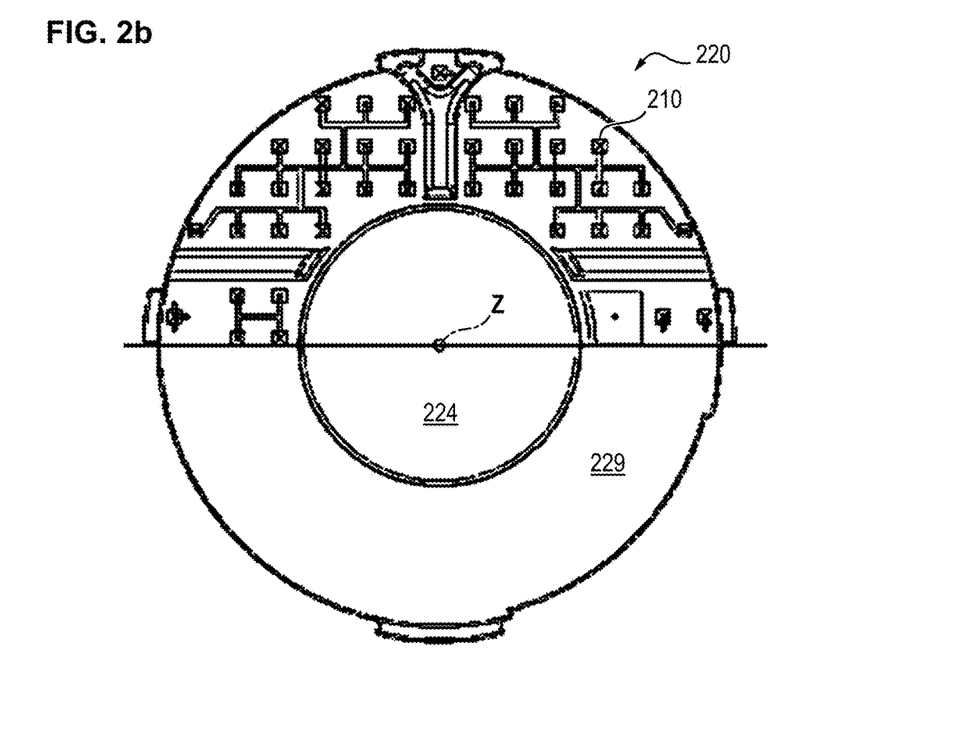

To this end, when the capsule 220 operates according to two positions, each microneedle 210 must not have an equivalent on the capsule 220 when the (dummy) rotation is applied to the microneedle. A convenient solution for this is to dispose the array of microneedles 210 only on one half of the contact surface 229. For example, as illustrated in FIGS. 2a and 2b, the array of microneedles 210 may occupy only one half at most of the contact surface (it is meant here the smallest surface which includes all the microneedles 210 of the capsule 220 and not the sum of the surface of each microneedle 210). There may be a slight tolerance to within a few microneedles (2 or 3 microneedles); preferably, there is no tolerance. After a 180° rotation, no microneedle is in the same location, in a fixed reference frame, as a microneedle before rotation. The skin is therefore pierced in a new area. Indeed, a few days are enough to cover the intact skin. However, the capsule must be changed approximately every week (therefore with a position change).

In the example of the Figures, two positions are provided (a single 180° rotation). However, it is possible to provide three positions (two rotations): in this case, the array of microneedles 210 is only disposed over one third or less of the surface. The principle is generalizable; the only constraints being the space available for the microneedles 210 and the possibilities of coupling with the casing 120.

It is also possible to provide a square capsule 220 with two positions (90° or 180° or 270° rotation) or four positions (90° rotations between two successive positions).

In practice, the coupling face 122 of the casing 120 may consist of an essentially planar surface, possibly with a projection 400 which acts as a guide, on which the capsule 220 can be positioned according to any rotation. However, the capsule 220 is advantageously attached to a patch 250 (see below), which is attached thereto to the casing 120. Accordingly, it is the patch 250 that determines the value of rotation for the positioning on the coupling face 122 of the casing 120. In the same way, the position of the capsule 220 in the patch 250 is determined (the user cannot arrange them as he wishes).

Electrical Connectors 226

Figure 3:
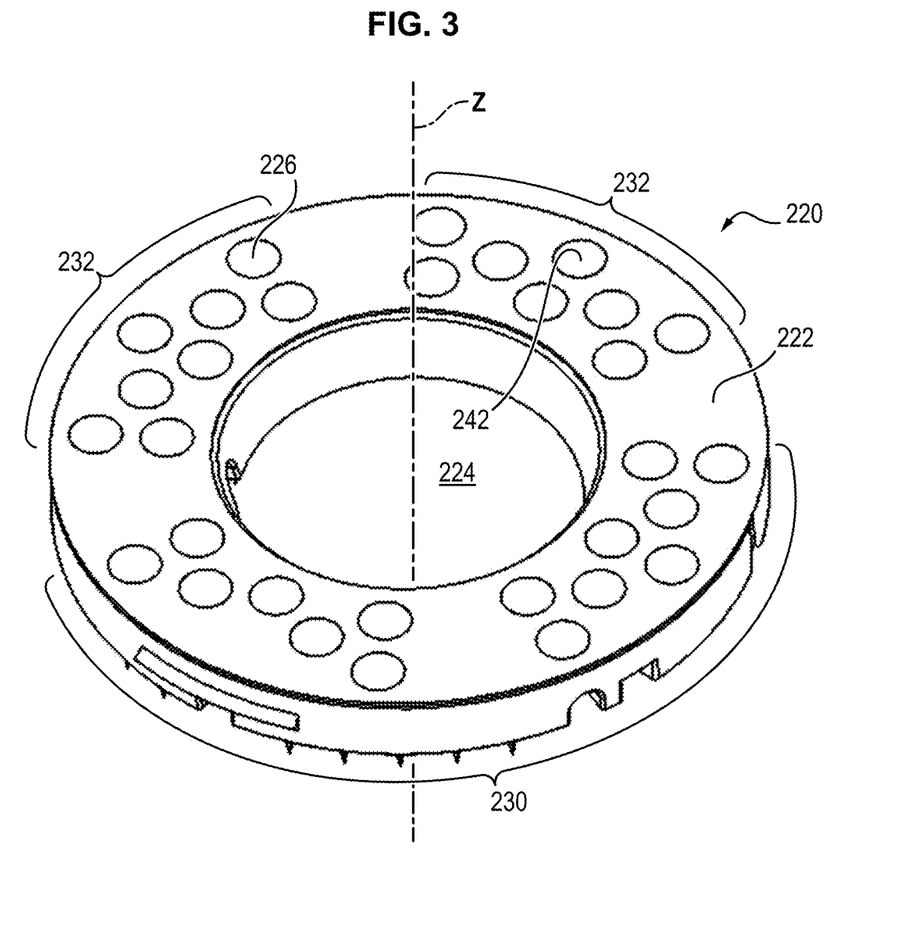
Figure 4:
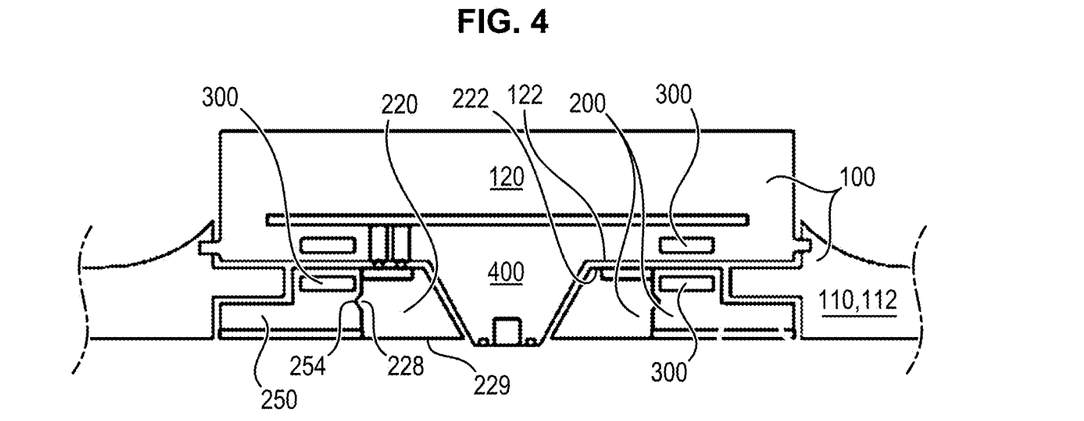
FIG. 4 illustrates the arrangement of the different modules that form the system (dimensions different from the dimensions of FIGS. 2a, 2b and 3).

In order to be able to exchange data with the casing 120, sets of electrical connectors 226 are provided on the coupling face 222 of the capsule 220 and on the coupling face 122 of the casing 120 (FIG. 3). The set 230 of connectors 226 of the capsule 220 is connected to the array of microneedles 210 (most of them in the case of microneedles 210 that take measurements or only some of them in the case of microneedles 210 that take samples) or to the sensor housed in the capsule 220 (in the case of microneedles 210 that take samples) in order to be able to transmit the information obtained by the capsule 220. The set 230 of connectors of the casing 120 is typically connected in particular in fine to a battery of the casing 120, to processors or to microprocessors, etc. These elements of the casing 120 will be detailed thereafter.

The electrical connectors 226 are for example made in the form of metal pins or pads. When two connectors 226 are brought into facing contact, an electrical connection is ensured.

Due to the rotation of the capsule 220 between two positions, a redundancy of the set 230 of connectors 226 must be provided (FIG. 3).

In a preferred embodiment, the redundancy of the set 230 of connectors 226 is located on the coupling face 222 of the capsule 220. Thus, for two positions, two sets of redundant connectors 230, 232 are provided: a first one 230 (which contains about fifteen connectors 226), and a second one 232 (which also contains about fifteen connectors 226), redundant relative to the first one.

By redundancy, it is meant that each set 230, 232 of connectors 226 can fulfill alone the function of electrical connection of the capsule 220 to the casing 120 (for normal operation of the capsule of course): it is a form of duplication.

The positioning of the two sets 230, 232 is made in dependence on the positioning of the array of microneedles 210 and of the set of connectors of the casing 120 to ensure that when the capsule 220 is in first and second position, it is indeed two different sets 230, 232 of electrical connectors 226 of the capsule 220 that are in contact with the set of complementary connectors of the casing 120. Thus, in the example of FIG. 3, the two sets 230, 232 of connectors are symmetrical by the same rotation as those mentioned for the microneedles 210 (the choice of numbering 230, 232 is arbitrary in the figures because the redundancy electrical interconnections are not drawn). When two positions are defined for the microneedle, each set 230, 232 of connectors occupies less than half of the coupling surface 222.

In another embodiment, the redundancy of the sets of connectors is on the coupling face 122 of the casing 120. This means that only one set 230 of connectors 226 is necessary on the coupling surface 122 of the capsule 220. Likewise, the positioning of the sets of redundant connectors on the casing 120 depends, during the design, on the provided rotation of the capsule 220.

Wireless Connection

Alternatively to the electrical connectors 226, it is possible to have a wireless (Bluetooth, infrared, RFID, NFC, etc.) exchange of information between the capsule 220 and the casing 120. This allows in particular overcoming the issues related to the redundancy of the electrical connectors, a fortiori when there is redundancy with a total of three or four sets of connectors (lack of space on the coupling faces). It is then possible to provide a cell in the capsule for the energy supply (conductimetry, etc.).

Position Indicators

As the capsule 220 is located under the casing 120 and is not necessarily visible, it is crucial that the user is able to know in which position the capsule 220 is located. Likewise, once the capsule 220 has been removed, the user can immediately forget how it was positioned or get the wrong position between the moment he looks at the capsule 220 in one direction and then deposits it on the skin in the other direction.

In order to resolve these difficulties, several position indicators are provided.

There may be a visual indicator 240, on the coupling surface 222 or on the contact face 229, in the form of a word, a sign (arrow, etc.), optionally with a complementary sign on the casing 120. There may also be two adjacent words or digits in the inverted position, so that depending on the 180° rotation, it is known in which direction the capsule 220 is located (for example 1-15 and, just below, upside down 16-31 to know in which position to put the capsule 220 depending on the day of the month).

Likewise, the visual indicator can be on a patch too (see below).

Figure 5:
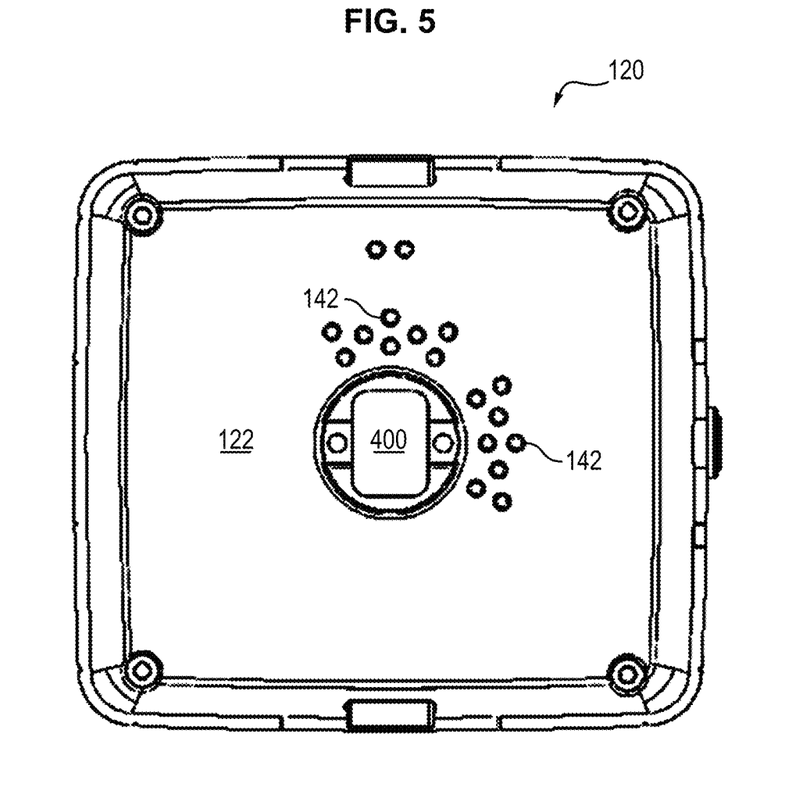
FIG. 5 illustrates one embodiment of the coupling face of the casing.

There may also be an electrical indicator, for example using an additional electrical contact or electrical connector 242 on the coupling face 222 (indicator which is therefore also visual) which is present only in one of the sets 230, 232 of connectors 226. Particularly, as illustrated in FIG. 3, an additional metal connector which breaks the symmetry of the sets 230, 232 of connectors 226 is noticed. When this electrical connector 242 is facing a complementary electrical connector 142 of the casing 120 (FIG. 5), a signal is detected. Otherwise, the electrical connector of the casing 120 is directly on the plastic of the capsule 220 and does not detect any signal or potential. Thus, the casing 120 automatically knows in which position the capsule 220 is located. Consequently, if the rotation is invisible to the casing 120 in terms of mechanical coupling, it remains identifiable by the casing 120 in terms of electrical coupling. In the symmetrical location without additional electrical connector 242, the visual indicator can be put therein.

The principle is the same if the redundancy of the set of connectors is on the casing 120: an additional connector is added on one of the two sets.

Second Embodiment: Several Positions within the Casing 120

In this embodiment, not illustrated, the capsule 220 is movable relative to the casing 120 according to at least one translation or rotation (or both) between a first coupling position and a second coupling position. The casing 120 therefore comprises a coupling face 122 with two different positions for the capsule 220 or a coupling face 122 movable within the casing 120.

The movement is chosen so that none of the microneedles 210 is in the same position as another microneedle when comparing the location of the microneedles 210 of the two positions in a fixed reference frame (casing 120 or wrist).

In a first variant, the capsule 220 moves by translation only.

Slide links may be suitable, with a sliding capsule 220 or a sliding coupling face 122.

In a second variant, the capsule 220 moves by rotation, for example without its shape remaining unchanged by the rotation: in other words, the casing 120 can provide a coupling face 122 with two complementary shapes to house the capsule 220 in the two positions (instead of a single complementary shape as in the first embodiment).

Third Embodiment: Kit of Capsules 220

In this embodiment not illustrated, a kit of capsules 220 comprises at least two capsules 220, each capsule 220 comprising a coupling face 222 configured to be coupled with a complementary shape of a casing 120, and an array of micro-needles 210 positioned on a planar contact surface 229 and configured to be inserted into the skin to sample or analyze a body fluid from the wearer of the body monitoring device 1 when the latter is positioned on the limb. The coupling face 222 may be preferably the same for all the capsules 220 of the kit, and the complementary shape of a casing 120 being preferably the same for each of the capsules 220. As a variant, the coupling faces 222 may be different between the capsules 220 of the kit, while each being complementary to the casing 120. It is meant by "complementary" that the shape of one element predominantly follows the shape of another element so as to fill a space, while tolerating shape variations so that this space is not totally filled. All the capsules 220 of the kit can have the same general shape. None of the microneedles 210 of a capsule 220 of the kit is in the same location as a microneedle 210 of another capsule 220 of the kit. Thus, it suffices to change a capsule 220 of the kit by another capsule 220 of the same kit to change the position of the microneedles 210.

It is also possible to provide a kit of capsules 220, in which at least part of the capsules 220 and the system comply with the first embodiment and/or with the second embodiment. The kit may for example comprise a first capsule 220 whose 180° rotation allows defining two first sets of positions of the microneedles 210, and a second capsule 220 whose 180° rotation allows defining two second sets of positions of the needles, different from the two first sets of positions of the first capsule 220. The microneedles 220 have different positions in each of the first and second sets of positions.

Complements to the System

The capsule 220 has the shape of a closed, typically sealed, box which can be coupled with the casing 120. This capsule 220 is interchangeable, which allows obtaining an economical and efficient system, where only the parts said consumables need to be changed. The capsule 220 may have an annular shape, with a through opening 224 in the center. In one variant mentioned above, the sensor is positioned inside the capsule 220 (or in the casing 120) and analyzes the fluid sampled by the microneedles 210.

Likewise, the second module 200 can comprise a patch 250, removably secured to the capsule 220. The patch 250 operates as an adhesive to maintain the penetration of the microneedles 210 into the skin. The patch 250 is preferably symmetrical at the opening, so that there is no problem of orientation of the patch for the placement on the limb. In order to change the orientation of the capsule, the user can either remove the patch+capsule and pivot the whole, or remove the capsule from the patch, make it pivot and put it back in the patch, which is re-engaged with the first module 100 in the same direction as originally.

Protrusions 228 on an outer wall of the capsule 220 are configured to engage in notches 254 of the patch.

As mentioned above, the first module 100 further comprises a casing 120 in which are disposed data processing means (particularly a processor or a microcontroller) configured to process measurements acquired by the sensor, and where appropriate, data storage means (in particular a memory, particularly of the flash type, and/or the memory of the microcontroller) allowing for example storing these measurements, and/or a date of the first use of each sensor to calculate an expiry date of the sensor(s) (the biochemical sensors have a limited lifespan). The data processing means are also used to generate instructions towards different components. In the framework of this description, these different functions are performed by the same unit. However, it is possible to provide for dedicated processors. The system also comprises a battery, advantageously a rechargeable battery, for the electrical supply to the components, for example via a port (understood as also being able to be used to connect the system 1, for example to a computer for downloading the acquired and/or processed data).

Preferably, the system 1 can comprise wireless connection means (particularly of the WiFi but also Bluetooth or even 3G/4G type) for a connection to a network, particularly the Internet, and a user interface such as a screen, possibly touch screen to display the monitoring results to the user.

Those skilled in the art are familiar with algorithms for processing sensor measurements and the associated interfaces, and will know how to implement them in the present system 1.

As indicated above, the casing 120 further comprises electrical connectors, on its coupling face 122 with the coupling face 222 of the capsule 220.

The second module 200 forms an interchangeable assembly of the system which is chosen according to the desired monitoring type and according to the state of deterioration of the microneedles 210 and/or of the sensor.

Indeed, insofar as the capsule 220 contains the microneedles 210 and/or the sensor, changing the capsule 220 allows changing the elements if they are at the end of their life or if it is desired to change the measured physical quantity, in a simple, fast and safe handling, without having to throw away other parts (particularly the first module).

Insofar as the capsule 220 minimizes the amount of expensive elements and/or materials (advanced electronic equipment such as a battery or wireless communication means), it is relatively inexpensive.

The invention claimed is:

1. A body monitoring system configured to be attached to a limb of a living being, comprising:
   a casing, comprising a coupling face,
   a capsule comprising microneedles configured to be inserted into skin of a wearer of the body monitoring system to sample and/or analyze a body fluid from the wearer when the body monitoring system is positioned on a limb of the wearer, the capsule comprising a coupling face, the casing and the capsule configured to be coupled by the coupling faces,
   wherein the capsule is configured to have different predetermined and selectable coupling positions on the coupling face of the casing and configured to permit the wearer to remove and selectively reposition the capsule with respect to the casing, such that in each predetermined selectable coupling position, and using the casing as a frame of reference, each microneedle is at a different location from a position of any of the microneedles at any other predetermined selectable coupling position.

2. The body monitoring system according to claim 1, wherein, in the reference frame of the casing, a displacement between the predetermined selectable different coupling positions is only a rotation.

3. The body monitoring system according to claim 1, in the reference frame of the casing, a displacement between the predetermined selectable different coupling positions is only a translation.

4. The body monitoring system according claim 1, wherein the casing comprises a battery and a processor configured to receive data relating to the body fluid sampled or analyzed by the array of microneedles.

5. The body monitoring system according to claim 4, wherein the casing comprises two redundant sets of electrical connectors, to ensure an electrical connection in the predetermined selectable coupling positions of the capsule, in combination with the capsule comprising a single set of electrical connectors.

6. The body monitoring system according to claim 1 comprising a patch, the capsule being removably attachable to the patch and the patch being removably attachable to the casing, the patch having an adhesive role.

7. The body monitoring system according claim 1, wherein the different predetermined and selectable coupling positions are defined as predetermined rotational abutments between portions of the casing and the capsule.

8. The body monitoring system according claim 1, wherein the microneedles are positioned in an array on a planar contact surface, the array occupying less than half of the planar contact surface.

9. The body monitoring system according to claim 1, wherein the coupling face of the capsule has an identical shape for coupling with a complementary shape of the casing according to the predetermined selectable coupling positions.

10. The body monitoring system according claim 1, comprising on the coupling face of the capsule a first set of electrical connectors.

11. The body monitoring system according to claim 10, comprising on the coupling face of the capsule a second set of electrical connectors, redundant relative to the first set of electrical connectors.

12. The body monitoring system according claim 1, comprising a position indicator to indicate to the wearer a position of the capsule.

13. The body monitoring system according claim 12, wherein the position indicator is a visual indicator represented on a planar contact surface on which the microneedles are positioned.

14. The body monitoring system according claim 12, wherein the position indicator is an electrical indicator.

15. The body monitoring system according claim 12, wherein the position indicator is a visual indicator represented on the coupling face of the capsule.

* * * * *